United States Patent [19]
Volz et al.

[11] Patent Number: 4,969,059
[45] Date of Patent: Nov. 6, 1990

[54] OFFSET NULLING SYSTEM FOR COMPUTER DISK DRIVES

[75] Inventors: Le Roy A. Volz, Northridge; Haim Nissimov, West Hills, both of Calif.

[73] Assignee: Rigidyne Corporation, Simi Valley, Calif.

[21] Appl. No.: 173,970

[22] Filed: Mar. 28, 1988

[51] Int. Cl.[5] .......................... G11B 5/55; G11B 5/596
[52] U.S. Cl. ................................ 360/78.04; 360/77.04
[58] Field of Search ........................... 360/77.02–77.11, 360/78.04, 78.08, 78.05, 78.11–78.14; 318/634; 369/32, 43, 44

[56] References Cited

U.S. PATENT DOCUMENTS

| 4,122,503 | 10/1978 | Allan | 360/78.05 |
| 4,419,701 | 12/1983 | Harrison et al. | 360/77.02 |
| 4,669,004 | 5/1987 | Moon et al. | 360/78.14 |
| 4,731,680 | 3/1988 | Moriyama et al. | 318/634 |
| 4,814,909 | 3/1989 | Brown et al. | 360/77.04 |

OTHER PUBLICATIONS

IBM TDB. vol. 19, No. 6, "Self-Calibrating Disk Storage Apparatus" Griffiths et al. 11/76, pp. 1991–1992.

Primary Examiner—Alan Faber
Assistant Examiner—Steven R. Garland
Attorney, Agent, or Firm—Bill D. McCarthy; Louis W. Watson; Edward P. Heller, III

[57] ABSTRACT

An offset nulling system is provided for use in computer disk drives to identify and compensate for actuator head position offset errors attributable to dc offsets of the disk drive control circuitry, thereby obtaining improved head alignment wiht a designated track on a memory storage disk or the like. The system includes a microcontroller adapted during a calibration mode to identify the position offset error and direction for selected tracks located respectively at radially inner and radially outer regions of the disk, and to adjust head position incrementally relative to those tracks to subsantially eliminate position offset error. Thereafter, during a normal operation mode of the disk drive, the microcontroller functions at the conclusion of a track seek step to adjust the head through a position offset compensation value and direction derived by interpolation of the position offset compensation value and direction identified during the calibration mode, in accordance with the specific track address.

18 Claims, 4 Drawing Sheets

OFFSET NULLING SYSTEM FOR COMPUTER DISK DRIVES

BACKGROUND OF THE INVENTION

This invention relates generally to computer disk drives and related control systems for controlling the position of one or more actuator heads with respect to one or more associated memory storage disks or the like, for purposes of accurately reading and/or writing data within closely spaced tracks on the disk surfaces. More particularly, this invention relates to an improved and simplified control system for automatic compensation of head position offset errors of the type generally attributable to dc offsets of the disk drive control circuitry.

In recent years, microcomputer equipment particularly such as so-called personal and desk top computers have become extremely popular for a wide variety of business and educational and recreational and other uses. Such computers commonly include a main central processor unit having one or more memory storage disks for storage of data. In many modern computers, the storage disk or disks are provided as part of a Winchester-type disk drive unit, sometimes referred to a "hard" disk, wherein the storage disks are supported on a rotatable spindle within a substantially sealed housing. The disks are rotatably driven in unison by a small spindle motor, and one or more electromagnetic heads are displaced by a head actuator assembly to traverse surfaces of the rotating disks for purposes of reading and writing data. Such Winchester-type disk drive units are generally preferred in comparison with so-called floppy disk drives due to their higher memory storage capacities and faster operating speeds.

For a typical Winchester-type disk drive, data is recorded onto magnetizable surfaces or surface films on the memory storage disks in the form of data bits adapted to be encoded and decoded in binary form. The data is recorded with the confines of narrow concentric tracks defined on the disk surfaces, with track densities in the range of about 500 to 1,000 and more tracks per inch being relatively well known. Accordingly, for any selected disk drive unit, the total memory storage capacity is directly proportional to the number of available data tracks.

In normal operation of the disk drive unit, a system controller is provided for identifying the location of data which has been stored by recording upon the storage disks, typically through the use of directory name, file name, and/or track address information. When reading of the data at a specific data track is desired, the system controller signals the head actuator assembly to displace the heads to the desired position. Alternately, when data recording or writing is desired, the system controller operates through the actuator assembly to move the heads in a manner aligning one head with a vacant data track.

For optimum data recording and subsequent retrieval, it is necessary for the heads to be positioned in substantially centered and accurate tracking alignment with respect to any selected one of the closely spaced data tracks. In this regard, the disk drive unit normally includes a servo system having means for detecting servo data bits which are prerecorded onto one or more of the storage disks. The servo system responds to detection of the servo data to adjust the actual head position for obtaining optimum centered head alignment with a selected track.

While available servo systems function generally satisfactorily for most operating conditions, such servo systems have not provided a simple and economic way to compensate for so-called position offset errors attributable to dc offsets of the disk drive circuitry. That is, the actual head position as controlled by the actuator assembly is subject to a variety of electronic and mechanical error factors, such as component characteristics variations, track length, cable bias, temperature, bearing friction, etc., all of which can result in head position offset errors of a magnitude which varies across the radial span of the disk or disks. Servo system detection and response to prerecorded servo data does not adequately compensate for such position offset errors during all operating conditions of the disk drive.

There exists, therefore, a significant need for a relatively simple, cost-efficient, and reliable system and method for offsetting or nulling dc position offset errors in a computer disk drive or the like. The present invention fulfills these needs and provides further related advantages.

SUMMARY OF THE INVENTION

In accordance with the invention, an improved system and method are provided for offset nulling of head position errors in a computer disk drive or the like. The system includes means for determining and compensating for position offset errors at different radial head positions relative to a memory storage disk during a calibration mode. The identified position offset compensation values and directions are then utilized by an interpolation process during a normal operation mode to null or compensate for the position offset error at any selected track address. As a result, significantly improved head alignment is achieved with respect to each data track across the radial span of the storage disk, thereby obtaining improved accuracy in reading and writing data.

In the preferred form of the invention, in general terms, the offset nulling system includes a microcontroller which operates in conjunction with the servo system of the disk drive to identify head position offset compensation values and directions during a calibration mode, for example, each time the computer associated with the disk drive is powered up. The microcontroller instructs a head actuator assembly to position the head for alignment with selected tracks located at or near radially inner and outer positions on the disk, and detects for each such track a conventional position error signal indicative of head-track misalignment. Alternately, in a disk drive having multiple actuator heads movable in unison through radial traverses with respect to multiple disk surfaces, a selected one of the heads may be used to detect the position error signal which reflects misalignment of each one of the multiple heads. The system also includes means for detecting the direction of such head-track misalignment. The system responds to the detected misalignment magnitude and direction to displace the head incrementally to a position in substantially centered alignment with the track, thereby compensating for the position offset error. The magnitude and direction of the position offset compensation value for each such track is saved. In a typical quadrature track configuration having track types in repeating groups of four, the calibration mode separately detects and compensates for the position offset error for all four track types at radially inner and outer positions on the disk.

Following the calibration mode, the offset nulling system utilizes the saved position offset compensation values to compensate for offset errors in accordance with the specific head position as the head radially traverses the disk during normal operation. More particularly, in an operation mode, the system interpolates the saved offset compensation values in accordance with actual head position at the conclusion of a track seek step to derive and apply an offset compensation factor to the head.

In accordance with the preferred system, during the normal operation mode, the radial span of the disk is subdivided into annular zones of a selected number. At the conclusion of a track seek step, the system recognizes the target track type and its zone address, and interpolates the difference between the radially inner and outer position offset compensation values for that track type, as identified during the calibration mode. The system applies the resultant calculated offset compensation factor to the head to achieve substantial nulling of dc offsets for improved head-track alignment.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
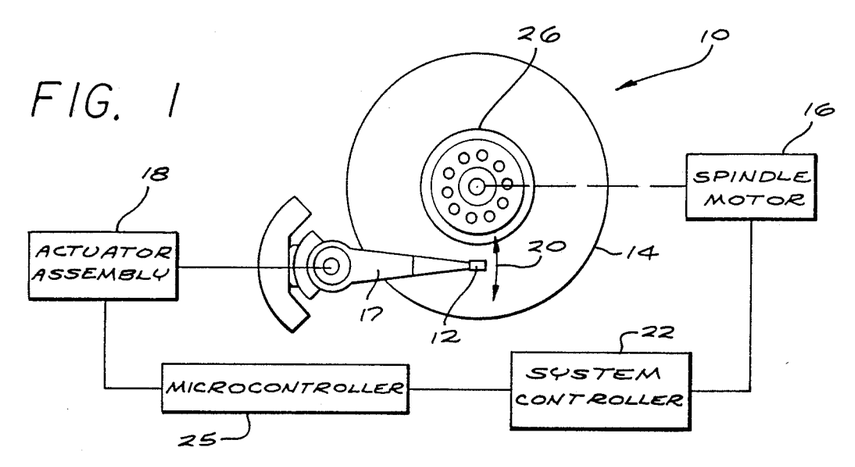
FIG. 1 is a somewhat schematic diagram illustrating a typical memory storage disk of a computer disk drive in association with a head for use in reading and/or writing data.

As shown in the exemplary drawings, an improved offset nulling system is provided for compensation of position offset errors in a computer disk drive referred to generally in FIGURE by the reference numeral 10, of the type used in microcomputers such as personal and desk top computers and the like. The offset nulling system is designed to provide a relatively simple and economical apparatus and method for maintaining an electromagnetic head 12 in accurate centered alignment with a selected annular track or cylinder on a memory storage disk 14 for accurate reading and/or writing of data.

As shown schematically in FIG. 1, a typical computer disk drive 10 includes at least one memory storage disk 14 mounted for rotation about a central axis thereof in response to operation of a spindle motor 16. The disk 14 includes a magnetizable surface film on at least one and preferably both sides thereof, wherein this film is adapted to record and store data in the form of binary data bits arranged in closely spaced concentric tracks. The electromagnetic head 12 is carried by an arm 17 of an actuator assembly 18 in close proximity with the disk surface for purposes of reading and/or writing data. As is known in the art, the actuator assembly 18 displaces the head 12 through radial traverses, as indicated by arrow 20 in FIG. 1, to align the head 12 with a selected one of the disk tracks. A system controller 22 acts through a microcontroller 25 to send appropriate commands to the actuator assembly 18 for positioning the head 12 in alignment with the selected disk track.

While FIG. 1 illustrates the general components of a typical disk drive 10 for use in a personal computer or the like, it will be understood that multiple memory storage disks 12 may be mounted for rotation in unison upon operation of the single spindle motor 16, and further that multiple actuator heads 12 may be provided on separate arms 17 of a multi-armed actuator assembly 18 for positioning the various heads in close relation with respective upper and lower surfaces of the multiple disks 14. In such a multi-disk drive construction, the several heads 12 are displaced in unison through radial traverses relative to the multiple disks, with the system controller 22 designating one of the heads to be operational at any given time for purposes of reading and/or writing data. An exemplary multiple disk, multiple head disk drive construction is described in more detail in U.S. Ser. No. 173,618, entitled ACTUATOR ASSEMBLY FOR HARD DISK DRIVES, filed Mar. 25, 1988 and now U.S. Pat. No. 4,879,617 issued Nov. 7, 1989, and in U.S. Ser. No. 173,619, entitled DISK DRIVE SPINDLE MOTOR, filed Mar. 25, 1988 and now U.S. Pat. No. 4,905,110 issued Feb. 27, 1990, both of which are incorporated by reference herein The use of a multiple disk, multiple head disk drive is, of course, frequently desired due to the increased overall disk surface area and correspondingly increased data storage capacity.

Figure 2:
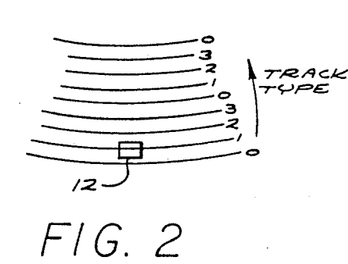
FIG. 2 is an enlarged schematic representation illustrating head position relative to multiple track types on the disk as used, for example, in a conventional quadrature track configuration.

In a typical multiple head disk drive, one disk surface comprises a servo surface bearing prerecorded servo data arranged in closely spaced tracks. This servo data is monitored by the associated head 12 to provide appropriate feedback signals through servo circuits (not shown) to the actuator assembly 18 for maintaining the head 12 in generally centered alignment with a specified servo track. Such alignment of the servo head 12 functions to position the remaining heads in a similar centered alignment with corresponding data tracks on their associated disk surfaces. In this regard, as viewed generally in FIG. 2, one common arrangement for the servo data is a so-called quadrature servo track configuration wherein the servo data is recorded in patterns of repeating track groups of four across the radial span of the disk surface. Each track group thus defines four recognizably different track types which are conventionally designated as track types "0", "1", "2" and "3" (FIG. 2). A more detailed description of preferred quadrature servo track configuration designed to permit servo system recognition of each track by specific address data is found in Ser. No. 173,770, filed Mar. 28, 1988, and entitled SERVO ADDRESS SYSTEM, which is incorporated by reference herein.

Figure 3:
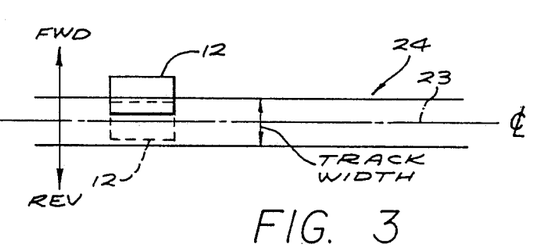
FIG. 3 is a further enlarged and developed schematic diagram depicting head position offset error relative to a single track on the disk.

The offset nulling system of the present invention operates in conjunction with the remaining components of the disk drive 10 to compensate for position offset errors attributable to a variety of so-called dc offsets encountered during normal system operation. More particularly, notwithstanding the normal operation of the system controller and the servo system, the actual position of the servo head 12 may be offset relative to a centerline 23 of a designated track 24, as viewed in enlarged scale in FIG. 3. This positional offset, normally identified as position offset error, may be due to the combined effects of factors such as component characteristics variations, specific track length, cable bias, temperature, bearing friction, spindle motor rotational resistance, actuator assembly design, servo circuit errors, etc. The position offset errors may be in either a forward (radially inward) direction or a reverse (radially outward) direction from the track centerline 23, with a magnitude which frequently varies for different track types of a quadrature servo track configuration (FIG. 2). The present invention provides a simple, automatic, cost-efficient and reliable apparatus and method for identifying the direction and the magnitude of position offset error, and for responding thereto to adjust the position of the head 12 to a substantially centered position aligned with the track centerline 23, as viewed in dotted lines in FIG. 3.

Figure 4:
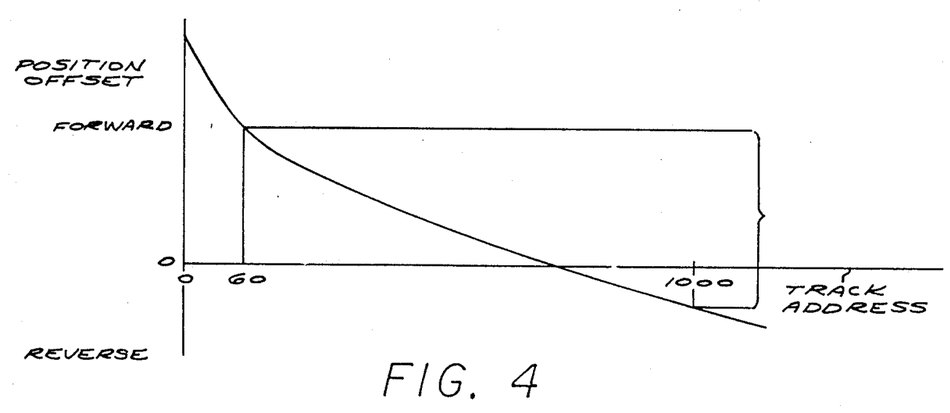
FIG. 4 is a graphic representation of exemplary position offset error in a computer disk drive, as a function of track address on the disk.

FIG. 4 is a graphic depiction of typical position offset error as a function of specific track number or address in a typical computer disk drive 10. That is, although the magnitude of offset error will vary for different disk drives, different track types, and different operating conditions, the necessary compensation to realign the head with a given track centerline normally decreases rapidly and nonlinearly over the first few tracks progressing in a radially inward direction from the outermost track, namely, track "0." Subsequent to this initial and substantially linear range, the necessary position offset compensation decreases at a slower, more linear rate for the remainder of the tracks, with FIG. 4 depicting this slower compensation decrease between about tracks 60 and 1,000 for a disk having approximately 1,000 to 1,100 tracks across its radial span. The nulling system of the present invention functions in a calibration mode to identify the requisite offset compensation by limited sampling of position offset errors each time the disk drive and related computer system are powered up. Thereafter, during a normal operation mode, the nulling system utilizes the sampled position offset compensation values to apply compensation to the head in accordance with the actual track address location of the head, and in a manner approximating the particular position offset curve (e.g., FIG. 4) for the specific track address.

The offset nulling system utilizes a microcontroller 25 responsive to detected position error signals to detect and compensate for dc offsets for each track type. While various specific microcontrollers may be used, such as Model 86C91, available commercially from Zilog Corporation of Campbell, California, the microcontroller may be provided in any suitable form capable of programming to carry out the calibration mode and the normal operation mode, to be described.

More particularly, when the computer system is powered up, the system components are subjected to an initial checking and calibration sequence. The offset nulling system functions in the calibration mode during this sequence to identify and compensate for position offset errors for selected tracks at selected radially inner and radially outer regions of a disk 12, such as the dedicated servo surface in a multiple disk drive. When a quadrature servo track configuration is used, the system separately identifies and compensates for each track type near the radially inner and outer regions of the disk surface. The specific track numbers selected during the calibration mode may vary, although selection of tracks at or near opposite ends of the more linear region of the offset compensation graph of FIG. 4 are preferred for best results. For example, with a disk having a quadrature servo track arrangement, tracks 60-63 and tracks 1,000-1,003 (track types "0" through "3") could be selected for position offset error identification and compensation during the calibration mode.

Figure 5:
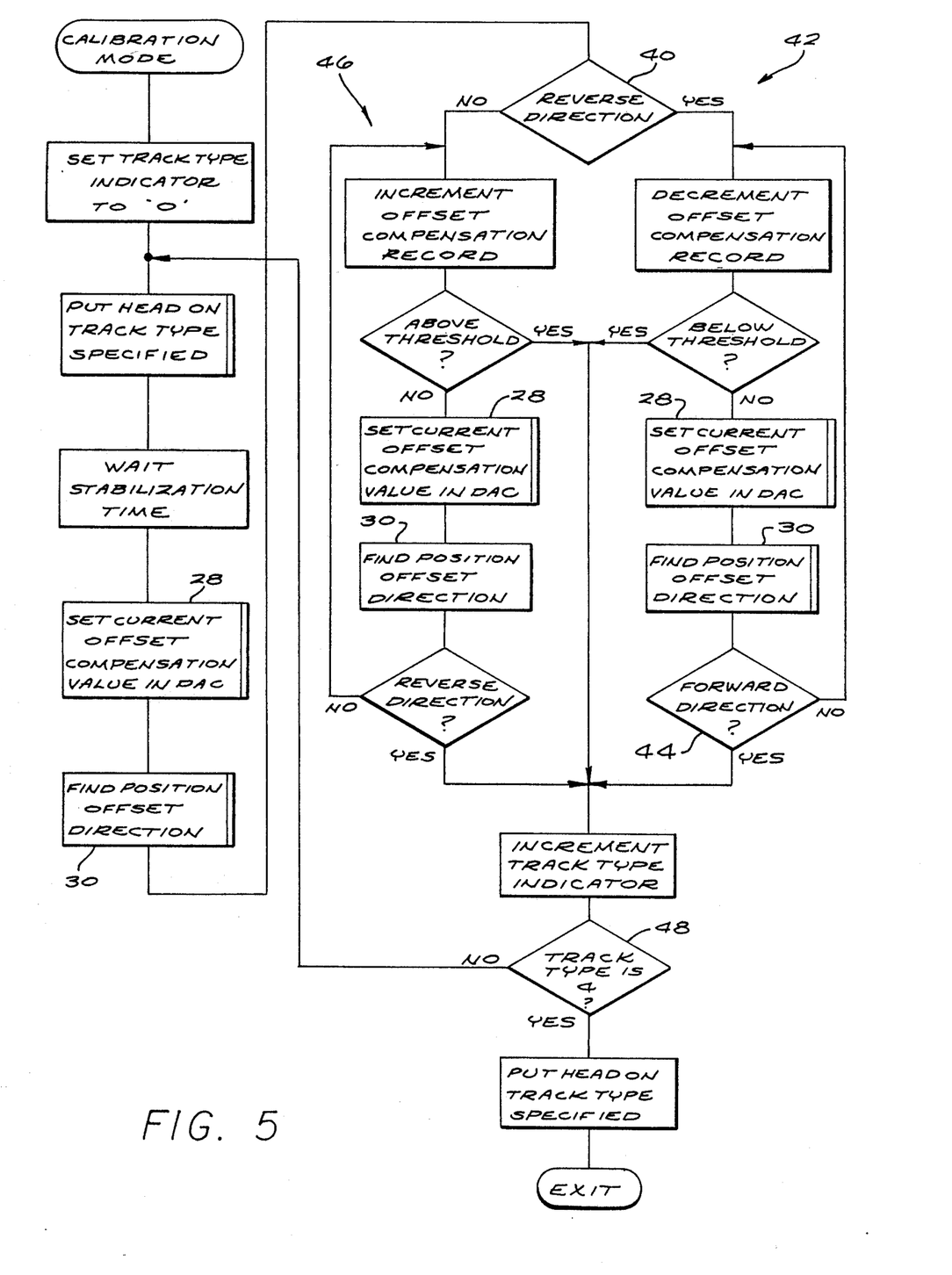
FIG. 5 is a flow chart depicting a method for identifying and compensating for position offset errors during a calibration mode.

FIG. 5 illustrates in flow chart form a preferred process sequence programmed into the microcontroller for position offset error identification and compensation during the calibration mode. More particularly, when the computer is powered up, the heads are displaced from a parked position located typically at a non-data landing zone 26 (FIG. adjacent the axis of disk rotation. A microcontroller program designated "calibration mode" (FIG. 5) is initiated wherein a track type indicator register is reset to track type "0." The program then enters a primary loop during which offset compensation values and directions for all track types "0" through "3" are calibrated. The actuator assembly 18 is then initially instructed to align the servo head 12 over the specified track type "0" at a radially inner region of the disk, for example, at track number 1,000. After a brief waiting time to insure stabilization of circuit components, the microprocessor program activates two subroutines 28 and 30 in sequence for respectively setting the current compensation value and direction, and for identifying the head position offset error.

Figure 6:
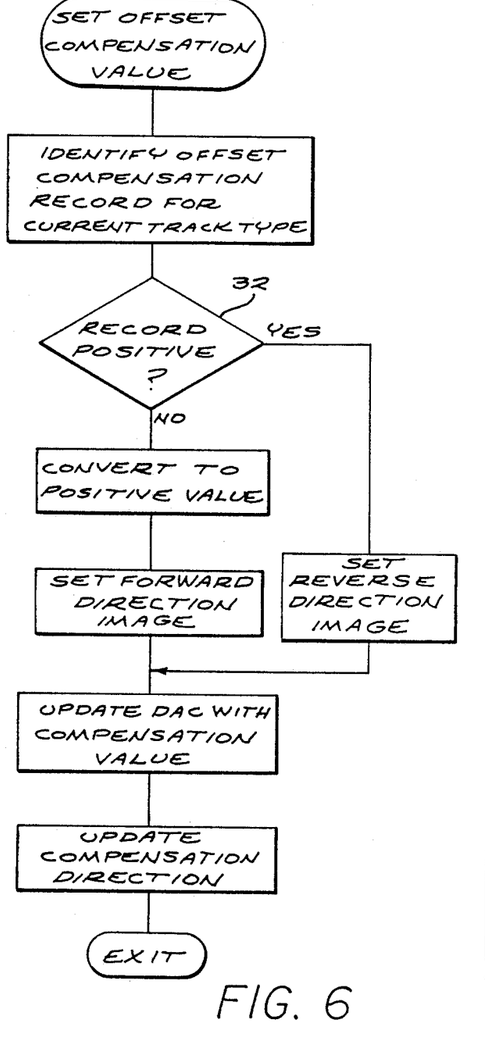
FIG. 6 is a flow chart illustrating a subroutine for identifying and compensating for position offset error, for use in the calibration mode as depicted in FIG. 5.

The subroutine 28, shown in FIG. 6, initially refers to the microcontroller memory to identify the offset compensation record for the current track type, namely, track type "0", as stored from a preceding calibration mode procedure. The stored offset compensation record is analyzed at decision block 32 to determine its positive or negative sign value. A negative compensation record sign indicates a forward spacing for the head 12 in a radially inward direction relative to the designated track (FIG. 3), whereas a positive sign reflects a reverse head spacing in a radially outward direction from the track centerline. When the offset compensation record is positive, the subroutine 28 sets the microprocessor memory to a reverse direction and then updates the compensation record into a system output device such as a digital-to-analog converter (DAC). Alternately, when the stored compensation record is negative, the microcontroller program converts the negative value to a positive sign and sets the system memory to a forward direction, after which the same system output device is updated with the stored compensation record. Following updating of the output device, the system hardware, namely, the actuator assembly 18 for displacing the head 12 in a forward or reverse direction, is appropriately commanded by the analog output to adjust head position based upon the stored record.

Figure 7:
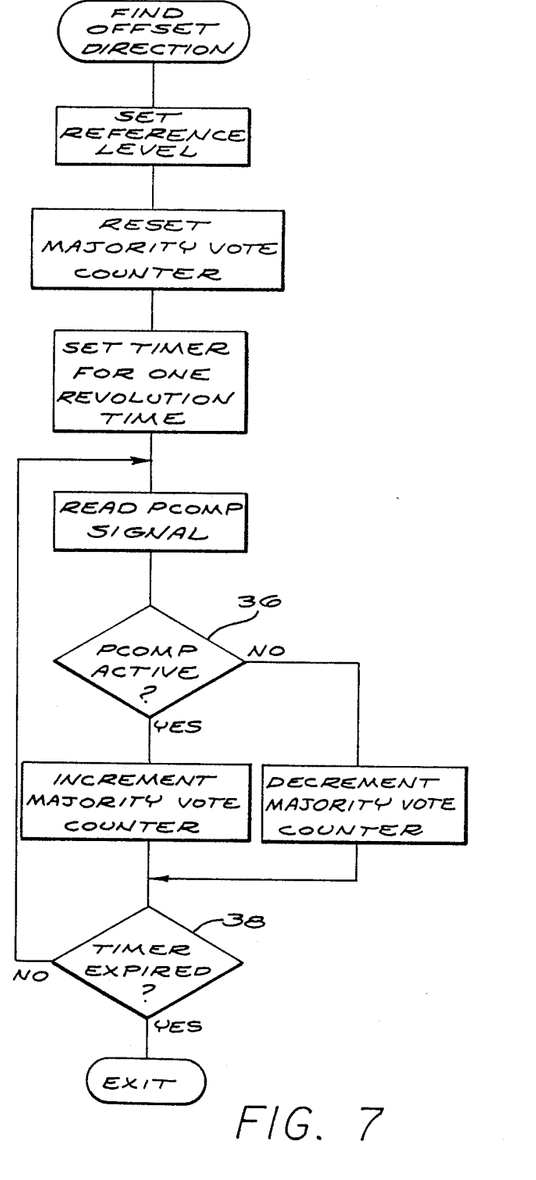
FIG. 7 is a flow chart illustrating a subroutine for use in determining offset error direction, for use in the calibration mode as depicted in FIG. 5.
Figure 8:
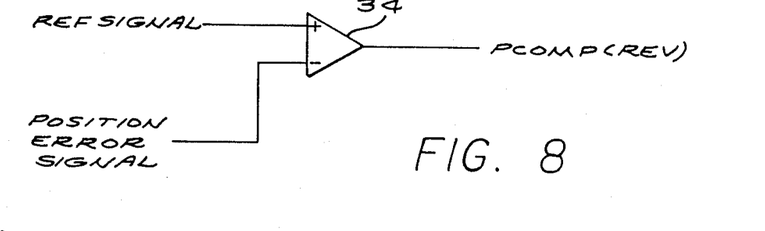
FIG. 8 is a schematic circuit diagram illustrating a comparator circuit for determining position offset error direction.

The subroutine 30 (FIG. 7) functions to determine the actual direction of current offset error of the head 12, relative to the designated track, irrespective of prior values stored in system memory. This directional subroutine 30 initially sets a voltage level for a reference signal, as viewed schematically in FIG. 8, with a position error signal obtained conventionally by monitoring head position relative to track crossover points in a quadrature servo track configuration. For a more detailed discussion of the position error signal and its relationship to head location relative to a track centerline, reference is made to copending U.S. Ser. No. 173,770, filed Mar. 28, 1988, and entitled SERVO ADDRESS SYSTEM, which is incorporated by reference herein. This comparison between the position error signal and the reference signal results in a comparator 34 (FIG. 8) assuming an active state when the magnitude of the reference signal exceeds the position error signal to indicate a "reverse" head position relative to the centerline of the designated track. This reverse head position is referred to as output PCOMP in FIG. 8.

The directional subroutine 30 (FIG. 7) resets a majority vote counter and initializes a timer clock adapted for timing an interval of one revolution of the disk 14. When this occurs, the subroutine reads the PCOMP output (FIG. 8) to determine if the output of the comparator 34 is active. As noted above, an active state for the comparator 34 indicates a negative offset of the head 12 in a radially outward direction with respect to the designated track centerline. At decision block 36, an inactive state for the comparator 34 results in decrementing the majority vote counter by a single digital count, whereupon a subsequent decision block 38 determines whether the single revolution time interval has expired. If time expiration has not occurred, the comparator state (PCOMP signal) is read again and the counter subsequently decremented if the comparator output is still inactive.

Alternately, when the output of the comparator 34 is active, the decision block 36 increments the majority vote counter by a single count and then rereads the comparator output provided the timer interval has not expired. Upon expiration of the timed interval, the decision block 38 terminates the subroutine 30 and returns to the main calibration mode program shown in FIG. 5. The resultant count of the majority vote counter, positive or negative in sign, indicates the reverse or forward direction of the head 12 relative to the designated track.

The calibration mode program (FIG. 5) includes a decision block 40 responsive to the forward or reverse direction of the head position offset, as determined by the directional subroutine 30. The block 40 responds to the offset direction to initiate one of two subloops for determining the magnitude of the position offset compensation record. More particularly, a reverse direction subloop 42 is responsive to a reverse direction position offset initially to decrement the offset compensation record stored in memory by a single count. If the resultant compensation record does not exceed a maximum threshold, i.e., the head is within a selected spacing from the track centerline, the once-decremented compensation record is updated into the digital-to-analog converter output device to adjust head position by repeated operation of the position subroutine 28. The offset directional is then redetermined by operation of the direction subroutine 30, whereupon decision block 44 determines if the head has transitioned from a reverse position to a forward position relative to the track centerline. If such transition has not occurred, the reverse direction subloop 42 is repeated to reduce further the reverse direction offset by digitally decrementing the compensation record one count at a time until transition occurs. When such transition to the forward direction position occurs, the subloop 42 is exited.

Similarly, in the event a forward head position offset is identified by the decision block 40, a forward direction subloop 46 is entered for displacing the head in digital increments until transition to a reverse direction is achieved. More particularly, as a first step, the stored offset compensation record is incremented by a single digit. If the head is within a predetermined maximum range from the track centerline, the position offset and directional subroutines 28 and 30 operate in sequence to update the output device for readjusting head position through a single incremental step, and then to redetermine forward or reverse head position relative to the track centerline. If transition to the reverse direction has not occurred, the subloop 46 is repeated. Alternately, when such transition to the reverse direction occurs, the subloop 46 is terminated.

Regardless of the subloop path 42 or 46, the position of the head 12 relative to the track centerline is adjusted incrementally until an appropriate transition to the opposite direction occurs. The final head position, therefore, is within one incremental step from the track centerline, with this final head position being substantially in centered alignment with the track. Alternately, if the head spacing exceeds the threshold limit, the appropriate subloop is exited and the compensation record remains at the threshold level.

Upon exiting the subloops 42 or 46, the track type indicator is incremented to identify the subsequent track type. Accordingly, the first time through the primary loop, the compensation value program substantially aligns the head 12 with track type "0." Successive loop passages are effective to align the head with track types "1", "2" and "3", thereby aligning the head with all four track types in a quadrature servo track configuration at locations near the inner diameter of the disk 14. When the track type indicator reads "4", decision block 48 exits the primary loop whereupon the microprocessor program repositions the head at track type "0" for confirmation of alignment.

The microprocessor program then positions the head 12 over a track type "0" at a radially outer region of the disk 14, such as at about track 60. The program loop of FIG. 5 is then repeated for all four track types, thereby aligning the head 12 with and appropriately storing compensation records for all four track types.

The above-described calibration mode thus identifies and compensates for position offset errors for all four track types at locations generally at radially inner and radially outer regions of the disk. For definition purposes, the compensation values obtained for the outer tracks are identified as "base" values for each track type, and the difference between the base values and the compensation values obtained for the same track types at radially inner regions of the disk are referred to as "difference" values. Moreover, the tracks across the radial span of the disk are divided into zone addresses of uniform track size to permit subsequent interpolation of the base and difference compensation values during a normal operation mode of the disk drive. In one working embodiment of the invention, a disk surface having about 1,100 tracks was divided into a total of nine zones identified as zone numbers 0 through 8, and progressing in number in a radially inward direction from the disk periphery.

Figure 9:
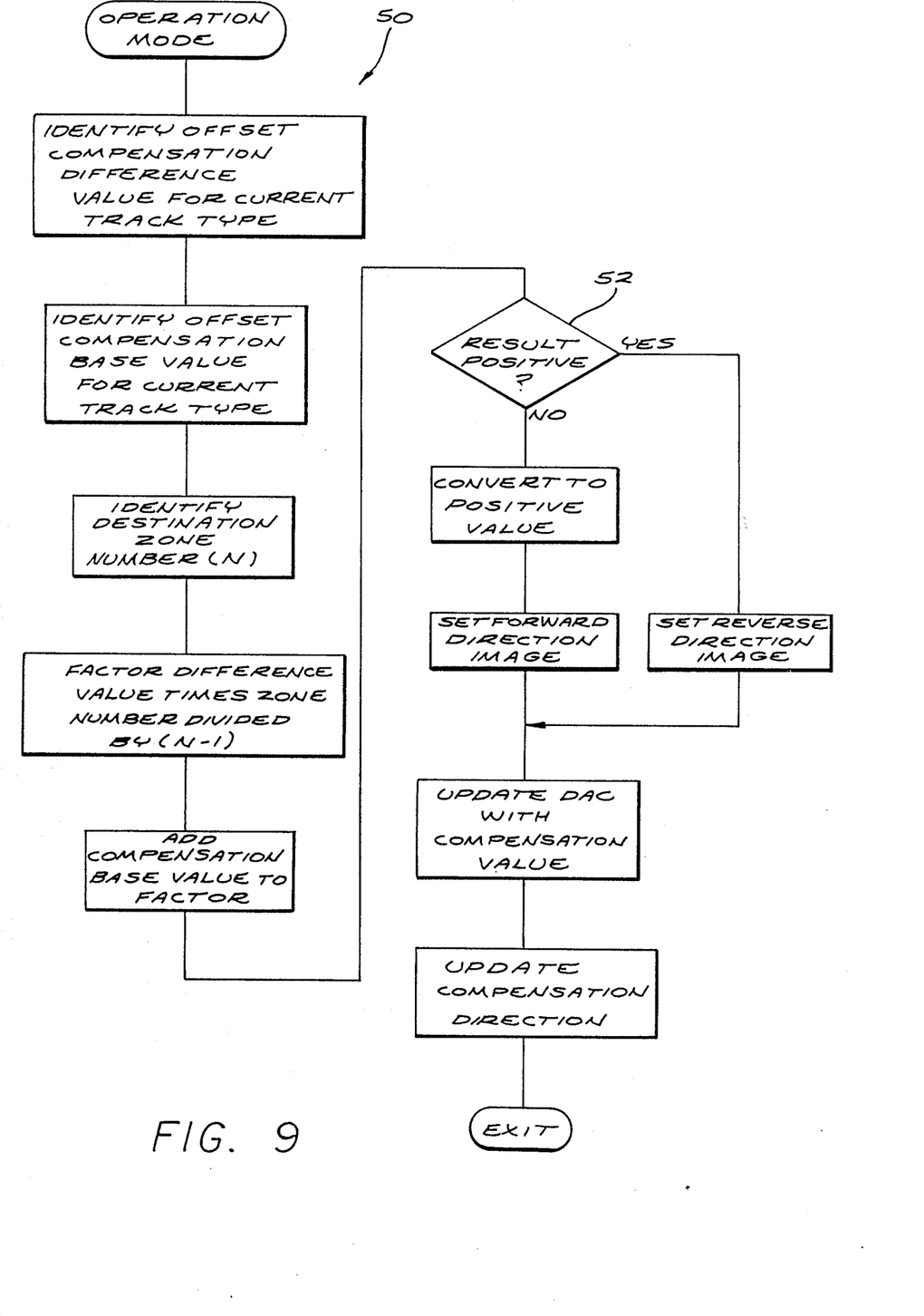
FIG. 9 is a flow chart depicting a method for applying an interpolated offset compensation factor during a normal operation mode.

In a normal operation mode, an "operation mode" program 50, as viewed in FIG. 9 and incorporated into the microcontroller, functions automatically at the conclusion of each track seek step to apply an interpolated offset compensation value to the head 12 for purposes of nulling anticipated head position offset errors. More specifically, when the system controller 22 (FIG. commands the actuator assembly 18 to displace the head 12 into alignment with a designated track on the disk surface, the microcontroller 12 responds to the destination track address to apply an offset compensation derived from the previously determined base and difference offset compensation values for the particular track type.

The offset compensation program is shown in flow chart form in FIG. 9. As an initial step, the program identifies from memory the offset compensation difference value for the particular track type to be aligned with the head 12 at the conclusion of a seek step. The program then identifies the offset compensation base value for that track type, in addition to the destination address by zone number "n". In this regard, the number of zone addresses is subject to variation, with increased zone addresses providing improved overall interpolative resolution with corresponding increased computation complexity.

With the above-discussed identified values, the offset compensation program factors or multiplies the compensation difference value times the zone number of the destination track, and divides the product by the total number of zones minus one $(n-1)$. This factor is then added to the compensation base value. Decision block 52 determines whether the calculated offset compensation value is positive or negative. If the result is positive, the program sets a reverse direction and appropriately updates the compensation value in the output device for adjusting head position to null position offset error. Alternately, if the result is negative, the result is converted to a positive value and the forward direction is set. The output device is then appropriately updated to in turn update and readjust the position of the head.

Accordingly the offset nulling system of the present invention provides a relatively simple and automated system and method for identifying head position offset errors at selected positions across the radial span of a disk. These identified offset errors are stored and interpolated for application at the conclusion of each seek step during normal disk drive operation for substantially nulling position offset errors. Importantly, the system automatically recalibrates itself each time the computer is powered up to accommodate the most current variables impacting the presence and magnitude of position offset errors.

A variety of modifications and improvements will be apparent to those skilled in the art. Accordingly, no limitation on the invention is intended by way of the foregoing description and accompanying drawings, except as set forth in the appended claims.

What is claimed is:

1. An offset nulling system for detecting and compensating for position offset error of a head relative to the centerline of a designated track on the surface of a memory storage disk having a plurality of generally concentric tracks, said head being movable through a seek step during a normal operation mode for alignment with the designated track, said nulling system comprising:

calibration mode means for detecting and compensating for position offset errors during a calibration mode at selected tracks located respectively at radially inner and outer regions on the disk surface, wherein said calibration mode means includes means for detecting the direction of position offset error when the head is generally aligned with one of said selected tracks, means for displacing said head incrementally toward a position eliminating the position offset error and means for redetermining the direction of the position offset error at the conclusion of each increment of head displacement, wherein the position offset error is substantially eliminated when said redetermining means detects a change of direction in the position offset error; and operation mode means responsive to the specific location of the designated track on the disk and the position offset errors detected by said calibration means for interpolating said position offset errors to apply an interpolated offset to the head for compensation of position offset error at the designated track.

2. The offset nulling system of claim 1 wherein said calibration mode means further includes record means for storing an offset compensation value and direction for each of said selected tracks during said calibration mode, and for applying said offset compensation value and direction to the head prior to detecting the direction of the position offset error by said detecting means, and update means for updating said offset compensation value and direction in accordance with actual position offset error during said calibration mode.

3. The offset nulling system of claim 2 wherein said record means stores said offset compensation value and direction for application to the head during a subsequent calibration mode.

4. The offset mulling system of claim 1 wherein the disk surface is subdivided into a selected number of track zones, said operation mode means including means for identifying the zone of said designated track, and for interpolating the position offset errors detected during said calibration mode in accordance with the identified zone of the designated track to apply an interpolated offset to the head.

5. An offset nulling system for detecting and compensating for position offset error of a head relative to the centerline of a designated track on the surface of a memory storage disk having a plurality of generally concentric tracks, said head being movable through a seek step during a normal operation mode for alignment with the designated track, said nulling system comprising:

calibration mode means including means for aligning the head with at least one selected track located generally at a radially inner region of the disk surface, means for detecting the direction of position offset error, means for displacing the head in incremental steps toward a position substantially eliminating the position offset error, means for redetermining the direction of the position offset error at the conclusion of each incremental step, wherein the position offset error is substantially eliminated when said redetermining means detects a change of direction in the position offset error, and means for storing a position offset compensation value and direction therefor;

said calibration mode means further including means for aligning the head with at least one selected track located generally at a radially outer region of the disk surface, means for detecting the direction of position offset error, means for displacing the head in incremental steps toward a position substantially eliminating the position offset error, means for redetermining the direction of the position offset error at the conclusion of each incremental step, wherein the position offset error is substantially eliminated when said redetermining means detects a change of direction in the position offset error, and means for storing a position offset compensation value and direction therefor; and operation mode means, responsive to the specific locations of the designated track and the selected tracks at the radially inner and outer regions thereof and to the position offset compensation values and directions therefor detecting by said calibration mode means, for interpolating said position offset compensation values and directions to apply an interpolated offset to the head for compensation of position offset error at the designated track.

6. The offset nulling system of claim 5 wherein the disk surface is subdivided into a selected number of track zones, said operation mode means including means for identifying the zone of said designated track, and for interpolating the position offset compensation values and directions detected during said calibration mode in accordance with the identified zone of the designated track to apply an interpolated offset to the head.

7. An offset nulling method for compensation of position offset errors of a head relative to the centerline of a designated track on the surface of a memory storage disk having a plurality of generally concentric tracks, said method comprising the steps of:

detecting and compensating for position offset errors during a calibration mode at selected tracks located respectively at radially inner and radially outer regions on the disk surface, and storing position offset compensation values and directions therefor, the detecting and compensating step comprising the steps of detecting the direction of position offset error when the head is generally aligned with one of said selected tracks, displacing said head incrementally toward a position eliminating the position offset error and redetermining the direction of the position offset error at the conclusion of each increment of head displacement, wherein the position offset error is substantially eliminated when the direction of the position offset error changes;

displacing the head through a seek step for general alignment with a designated track on the disk surface during a normal operation mode;

identifying the specific location of the designated track on the disk surface;

interpolating the position offset compensation values and directions detected during the calibration mode in accordance with the location of the designated track to obtain an interpolated offset signal; and adjusting the position of the head in accordance with the interpolated offset signal.

8. The method of claim 7 further including the steps of storing an offset compensation value and direction for each of said selected tracks during said calibration mode, and applying the stored offset compensation value and direction to the head prior to detecting the direction of the position offset error and updating said offset compensation error signal in accordance with actual position offset error during said calibration mode.

9. The method of claim 8 further including the step of storing the offset compensation value and direction for application to the head during a subsequent calibration mode.

10. The method of claim 7 wherein said interpolating step comprises subdividing the disk surface into a selected number of track zones, identifying the zone of said designated track, and interpolating the position offset values and directions detected during said calibration mode in accordance with the identified zone of the designated track to apply an interpolated offset to the head.

11. An offset nulling method for compensation of position offset errors of a head relative to the centerline of a designated track on the surface of a memory storage disk having a plurality of generally concentric tracks, said method comprising the steps of:

a calibration mode step including aligning the head with at least one selected track located generally at a radially inner region of the disk surface detecting the direction of position offset error, displacing the head incremental steps toward a position substantially eliminating the position offset error, redetermining the direction of the position offset error at the conclusion of each incremental step, halting said incremental stepping when change of direction in the position offset error occurs, and storing a position offset compensation value and direction therefor;

said calibration mode step further includes aligning the head with at least one selected track located generally at a radially outer region of the disk surface, detecting the direction of position offset error, displacing the head incremental steps toward a position substantially eliminating the position offset error, redetermining the direction of the position offset error at the conclusion of each incremental step, halting said incremental stepping when change of direction in the position offset error occurs, and storing a position offset compensation value and direction therefor; and displacing the head through a seek step for general alignment with a designated track on the disk surface during a normal operation mode;

identifying the specific location of the designated track on the disk surface;

interpolating the position offset compensation values and directions detected during the calibration mode in accordance with the location of the designated track to obtain an interpolated offset signal; and adjusting the position of the head in accordance with the interpolated offset signal.

12. The method of claim 11 wherein said interpolating step comprises subdividing the disk surface into a selected number of track zones identifying the zone of said designated track, and interpolating the position offset compensation values and directions detected during said calibration mode in accordance with the identified zone of the designated track to apply an interpolated offset to the head.

13. The method of claim 11 wherein the concentric tracks on the disk surface comprise a quadrature track configuration including different track types in repeating groups of four across a radial span of the disk surface, and wherein said calibration mode step is repeated for a first group of all four track types located generally at a radially inner region of the disk surface, and for a second group of all four track types located generally at a radially outer region of the disk surface, and wherein said interpolating step includes responding to the specific location and track type of the designated track and the position offset compensation values and directions detected during said calibration mode step for the track type.

14. The method of claim 13 wherein said interpolating step comprises subdividing the disk surface into a selected number of track zones, identifying the zone and the track type of the designated track, and interpolating the position offset compensation values and directions for that track type as detected during said calibration mode in accordance with the identified zone.

15. An offset nulling system for detecting and compensating for position offset error of a head relative to the centerline of a designated track on the surface of a memory storage disk having a plurality of generally concentric tracks, said head being movable through a seek step during a normal operation mode for alignment with the designated track, said nulling system comprising:
    calibration mode means for detecting and compensating for position offset errors during a calibration mode at selected tracks located respectively at radially inner and outer regions on the disk surface; and
    operation mode means responsive to the specific location of the designated track on the disk and the position offset errors detected by said calibration means for interpolating said position offset errors to apply an interpolated offset to the head for compensation of position offset error at the designated track;
wherein the concentric tracks on the disk surface comprise a quadrature track configuration including different track types in repeating groups of four across a radial span of the disk surface, and wherein said calibration mode means detects and compensates for position offset errors for a first group of all four track types located generally at a radially inner region of the disk surface, and for position offset errors for a second group of all four track types located generally at a radially outward region of the disk surface, and wherein said operation mode means is responsive to the specific location and track type of the designated track and the position offset errors detected by said calibration mode means for that track type.

16. The offset nulling system of claim 15 wherein the disk surface is subdivided into a selected number of track zones, said operation mode means including means for identifying the zone and the track type of the designated track, and for interpolating the position offset errors for that track type as detected during said calibration mode in accordance with the identified zone.

17. An offset nulling method for compensation of position offset errors of a head relative to the centerline of a designated track on the surface of a memory storage disk having a plurality of generally concentric tracks, said method comprising the steps of:
    detecting and compensating for position offset errors during a calibration mode at selected tracks located respectively at radially inner and radially outer regions on the disk surface, and storing position offset compensation values and directions therefor;
    displacing the head through a seek step for general alignment with a designated track on the disk surface during a normal operation mode;
    identifying the specific location of the designated track on the disk surface;
    interpolating the position offset compensation values and directions detected during the calibration mode in accordance with the location of the designated track to obtain an interpolated offset signal; and
    adjusting the position of the head in accordance with the interpolated offset signal;
wherein the concentric tracks on the disk surface comprise a quadrature track configuration including different rack types in repeating groups of four across a radial span of the disk surface, and wherein said detecting and compensating step is repeated for a first group of all four track types located generally at a radially inner region of the disk surface, and for a second group of all four track types located generally at a radially outward region of the disk surface, and wherein said interpolating step includes responding to the specific location and track type of the designated track and the position offset errors detected during said calibration mode for that track type.

18. The method of claim 17 wherein said interpolating step comprises subdividing the disk surface into a selected number of track zones, identifying the zone and the track type of the designated track, and interpolating the position offset values and directions for that track type as detected during said calibration mode in accordance with the identified zone.

* * * * *

UNITED STATES PATENT AND TRADEMARK OFFICE
CERTIFICATE OF CORRECTION

PATENT NO. : 4,969,059
DATED : November 6, 1990
INVENTOR(S) : Le Roy A. Volz and Haim Nissimov It is certified that error appears in the above-identified patent and that said Letters Patent is hereby corrected as shown below:

Column 3, line 68, after "FIGURE" and before "by" insert --1--;

Column 6, line 31, after "(FIG." and before "adjacent" insert --1),--;

Column 9, line 13, after "(FIG." and before "com-" insert --1)--;

Column 13, line 15 (claim 13), delete "the" and substitute therefor --that--; and Column 14, line 36, delete "rack" and substitute therefor --track--.

Signed and Sealed this

Twenty-first Day of July, 1992

Attest:

DOUGLAS B. COMER

*Attesting Officer*      *Acting Commissioner of Patents and Trademarks*